(12) United States Patent
Suzuki et al.

(10) Patent No.: US 10,897,031 B2
(45) Date of Patent: Jan. 19, 2021

(54) BATTERY, ELECTRIC STORAGE DEVICE, ELECTRIC VEHICLE

(71) Applicant: MURATA MANUFACTURING CO., LTD., Kyoto (JP)

(72) Inventors: Kazuhiko Suzuki, Kyoto (JP); Noriaki Kokubu, Kyoto (JP); Kunio Sodeyama, Kyoto (JP); Takao Mori, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 155 days.

(21) Appl. No.: 16/210,575

(22) Filed: Dec. 5, 2018

(65) Prior Publication Data

US 2019/0109303 A1 Apr. 11, 2019

Related U.S. Application Data

(63) Continuation of application No. PCT/JP2017/019335, filed on May 24, 2017.

(30) Foreign Application Priority Data

Aug. 30, 2016 (JP) .................. 2016-168142

(51) Int. Cl.
*H01M 2/04* (2006.01)
*H01M 2/34* (2006.01)
(Continued)

(52) U.S. Cl.
CPC ......... *H01M 2/046* (2013.01); *H01M 2/1235* (2013.01); *H01M 2/34* (2013.01);
(Continued)

(58) Field of Classification Search
CPC ........................ H01M 2/345; H01M 2/1241
See application file for complete search history.

(56) References Cited

U.S. PATENT DOCUMENTS 8,962,167 B2   2/2015 Kim et al.
2003/0013005 A1  1/2003 Chang
(Continued)

FOREIGN PATENT DOCUMENTS

JP    H10261392 A    9/1998
JP    2001307706 A   11/2001
(Continued)

OTHER PUBLICATIONS

Japanese Office Action dated Sep. 3, 2019 in corresponding Japanese Application No. 2018-536939.
(Continued)

*Primary Examiner* — Maria Laios
*Assistant Examiner* — George Kim
(74) *Attorney, Agent, or Firm* — K&L Gates LLP

(57) ABSTRACT

A battery includes a safety valve configured to cause a deformation due to an increase in internal pressure of the battery; a restraining part including a plurality of first protrusions provided along a first circumference to serve as a restrainer against a lead part when the safety valve and the lead part are shut off due to deformation of the safety valve; and an insulating holder including a plurality of second protrusions provided along a second circumference to insulate the safety valve and the restraining part, where a number of the first protrusions and the second protrusions arranged on a diagonal line including the first circumference and the second circumference is 3 or less.

12 Claims, 8 Drawing Sheets

(51) Int. Cl.
*H01M 2/12* (2006.01)
*H01M 10/04* (2006.01)
*H01M 10/0525* (2010.01)
*H01M 10/052* (2010.01)

(52) U.S. Cl.
CPC ........ *H01M 2/345* (2013.01); *H01M 10/0422* (2013.01); *H01M 10/052* (2013.01); *H01M 10/0525* (2013.01); *H01M 2220/20* (2013.01)

(56) References Cited

U.S. PATENT DOCUMENTS

2008/0107957 A1   5/2008  Meguro et al.
2015/0333313 A1*  11/2015 Yamato ................. H01M 2/263
                                                        429/61
2017/0309879 A1*  10/2017 Ko ...................... H01M 2/0413

FOREIGN PATENT DOCUMENTS

| JP | 2007200755 A | 8/2007 |
| JP | 2009252409 A | 10/2009 |
| JP | 2016146357 A | 8/2016 |

OTHER PUBLICATIONS

International Search Report for Application No. PCT/JP2017/019335, dated Aug. 15, 2017.

* cited by examiner

BATTERY, ELECTRIC STORAGE DEVICE, ELECTRIC VEHICLE

CROSS REFERENCE TO RELATED APPLICATIONS

The present application is a continuation of PCT patent application no. PCT/JP2017/019335, filed on May 24, 2017, which claims priority to Japanese patent application no. JP2016-168142 filed on Aug. 30, 2016, the entire contents of which are being incorporated herein by reference.

BACKGROUND

The present disclosure generally relates to a battery, an electric storage device, and an electric vehicle.

It is possible to charge and discharge secondary batteries repeatedly, unlike dry cell batteries (primary batteries). In addition, since it is possible to increase the capacities of secondary batteries, the application range of the secondary batteries has been expanded in recent years, such as portable electronic devices, hybrid vehicles, and power tools. Among such secondary batteries, lithium ion secondary batteries are widely used because the batteries are high in operating voltage and high in energy density per unit mass. Lithium ion secondary batteries are classified into a can shape and a pouch shape depending on the shapes of exterior materials, and the can shape is classified into a cylindrical shape and an angular shape depending on the shapes of battery cans. It is common to provide lithium ion secondary battery with safety mechanisms that operate when the internal pressures of the batteries reaches a pressure equal to or higher than a predetermined pressure.

SUMMARY

The present disclosure generally relates to a battery, an electric storage device, and an electric vehicle.

The safety mechanism is usually composed of multiple parts. Variations in the combination of the multiple parts may possibly cause the safety mechanism to vary in configuration and operation.

Therefore, it is an object of the present disclosure to provide a battery, an electric storage device, and an electric vehicle configured to keep a safety mechanism as much as possible from varying in configuration and operation.

According to an embodiment of the present disclosure, a battery is provided. The battery includes:

a safety valve configured to cause a deformation due to an increase in internal pressure of the battery;

a restraining part including a plurality of first protrusions provided along a first circumference to serve as a restrainer against a lead part when the safety valve and the lead part are shut off due to deformation of the safety valve; and an insulating holder including a plurality of second protrusions provided along a second circumference to insulate the safety valve and the restraining part, where a number of the first protrusions and the second protrusions arranged on a diagonal line including the first circumference and the second circumference is 3 or less.

According to an embodiment of the present disclosure, the present disclosure may include an electric storage device including this battery as described herein.

According to an embodiment of the present disclosure, the present disclosure may include an electric vehicle including this battery as described herein.

According to at least one embodiment of the present disclosure, the safety mechanism can be kept as much as possible from varying in configuration and operation. It is to be noted that the effects described herein are not necessarily to be considered limited, and other suitable properties relating to the present technology may be realized and as further described. In addition, the contents of the present disclosure are not to be construed as being limited by the exemplified effects.

BRIEF DESCRIPTION OF THE FIGURES

FIG. 5 is a diagram for explaining a first circumference, a second circumference, and the like.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
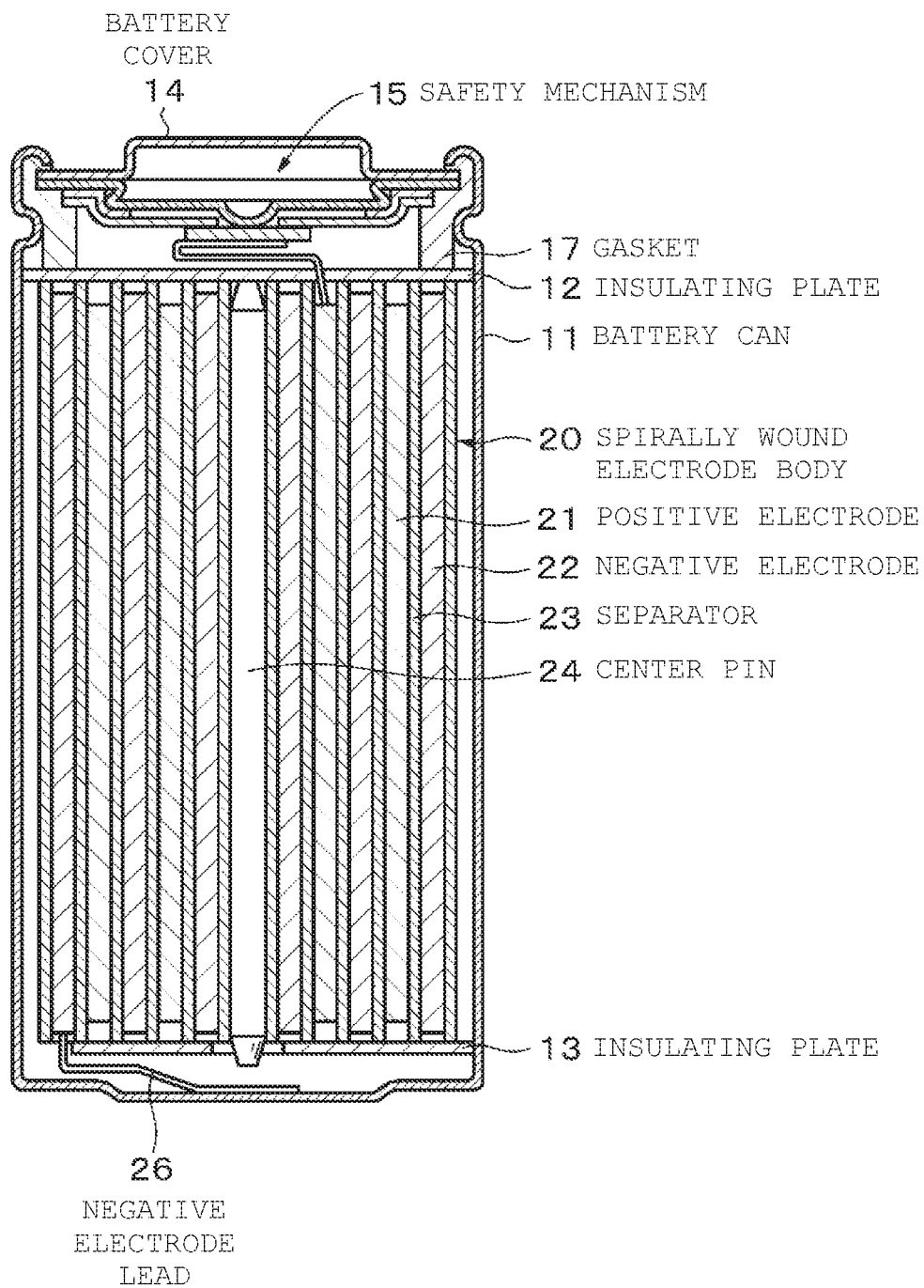
FIG. 1 is a diagram illustrating a configuration example of a battery according to an embodiment of the present disclosure.
Figure 2:
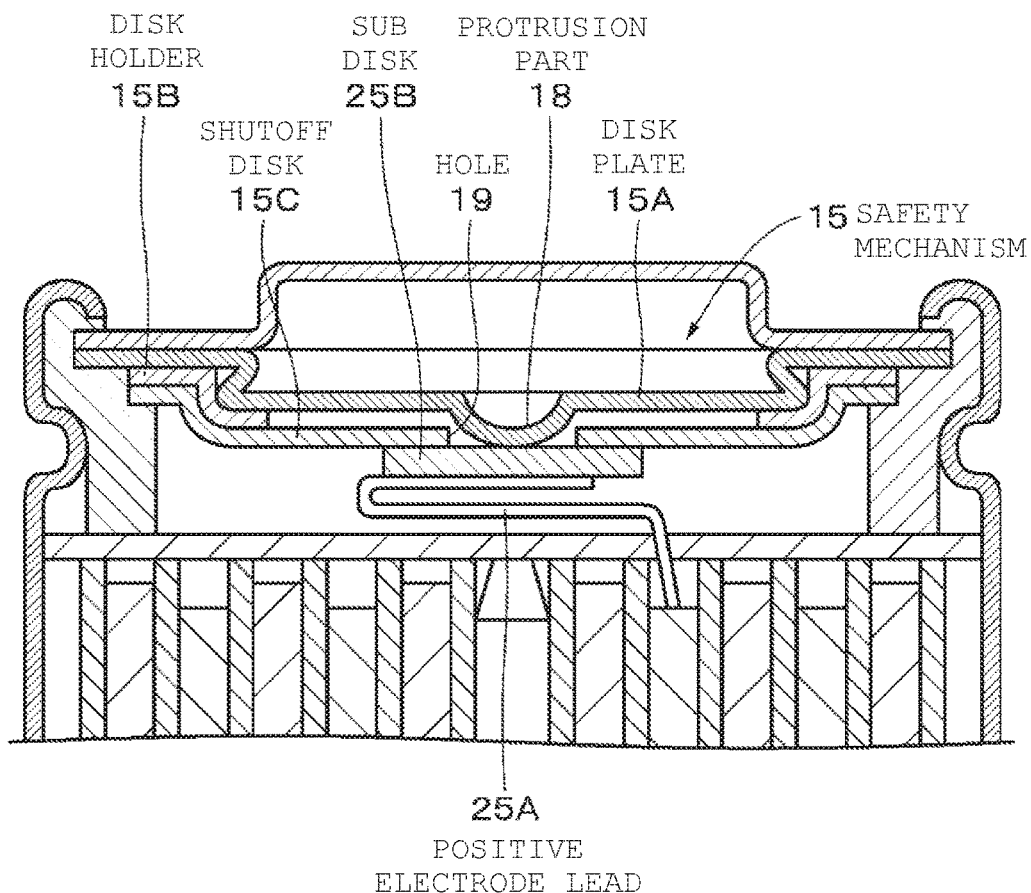
FIG. 2 is an enlarged view of a part of a battery according to an embodiment of the present disclosure in an enlarged manner.

A configuration example of a secondary battery (nonaqueous electrolyte secondary battery) according to one embodiment of the present disclosure will be described below. FIG. 1 is an overall view for explaining the configuration example of the nonaqueous electrolyte secondary battery, and FIG. 2 is an enlarged view illustrating a part (around the positive electrode side) of FIG. 1 in an enlarged manner. The nonaqueous electrolyte secondary battery is, for example, a so-called lithium ion secondary battery in which the capacity of a negative electrode is represented by a capacity component obtained by occlusion and release of lithium (Li) which is an electrode reactant. The nonaqueous electrolyte secondary battery is, for example, what is referred to as a so-called cylindrical type, which has, inside a substantially hollow cylindrical battery can 11, a spirally wound electrode body 20 with a pair of band-shaped positive electrodes 21 and band-shaped negative electrode 22 stacked with a separator 23 interposed therebetween and spirally wound.

The battery can 11 is made of iron (Fe) plated with nickel (Ni), which has one end closed and the other end opened. Inside the battery can 11, an electrolytic solution as a liquid electrolyte is injected, with which the positive electrode 21, the negative electrode 22, and the separator 23 are impregnated. In addition, a pair of insulating plates 12, 13 is each disposed perpendicularly to the winding circumferential surface so as to sandwich the spirally wound electrode body 20.

Nickel (Ni), stainless steel (SUS), aluminum (Al), titanium (Ti), or the like may be used as a material for the battery can 11. This battery can 11 may be plated, for example, with nickel or the like in order to prevent electrochemical corrosion due to nonaqueous electrolytic solution, associated with nonaqueous electrolyte battery charging/discharging. The open end of the battery can 11 has a battery cover 14, a safety valve mechanism 15, and a safety mechanism 15 and a thermosensitive resistive element (PTC element: Positive Temperature Coefficient) 16 provided inside the battery cover 14, which are attached by crimping via a gasket 17 for insulated sealing. Thus, the inside of the battery can 11 is hermetically sealed. It is to be noted that FIGS. 1 and 2 shows therein an example of a battery without the thermosensitive resistive element 16.

The battery cover 14 is made of the same material as the battery can 11, for example, and provided with an opening for discharging the gas generated inside the battery. For the safety mechanism 15, a disk plate 15A as a safety valve, a disk holder 15B as an insulating holder, and a shutoff disk 15C as a restraining part are stacked in order. The disk plate 15A has a protrusion part 18 connected to a positive electrode lead 25A led out from the spirally wound electrode body 20 via a sub disk 25B disposed so as to cover a hole 19 provided at the center part of the shutoff disk 15C. The connection between the disk plate 15A and the positive electrode lead 25A via the sub disk 25B prevents the positive electrode lead 25A from being drawn from the hole 19 at the time of reversing the disk plate 15A.

The disk holder 15B is made of an insulating material, and intended to insulate the disk plate 15A from the shutoff disk 15C.

The safety mechanism 15 is, when the internal pressure of the nonaqueous electrolyte battery reaches a pressure equal to or higher than a certain level due to an internal short circuit of the battery or heating from the outside of the battery, or the like, intended to invert and then deform the disk plate 15A, and electrically disconnect the protrusion 18, the battery cover 14, and the rotary electrode body 20. More specifically, when the disk plate 15A is inverted, the sub disk 25B is restrained by the shutoff disk 15C to release and shut off the connection between the disk plate 15A and the sub disk 25B.

In addition, when gas is further generated inside the battery, thereby further rising the internal pressure of the battery, the disk plate 15A is partially broken, thereby allowing the gas to be discharged toward the battery cover 14.

In addition, for example, a plurality of gas vent holes (not shown) is provided around the hole 19 of the shutoff disk 15C, and configured such that when gas is generated from the spirally wound electrode body 20, the gas can be effectively discharged toward the battery lid 14.

The thermosensitive resistive element 16 increases in resistance value when as the temperature is raised, and electrically disconnect the battery cover 14 and the spirally wound electrode body 20 to interrupt current, and prevent abnormal heat generation due to excessive current. The safety mechanism 15 is electrically connected to the battery cover 14 via thermosensitive resistive element 16. In particular, a battery compatible with large current discharge may include no thermosensitive resistive element 16. In such a case, the safety mechanism 15 is electrically connected directly to the battery cover 14. The gasket 17 is made of, for example, an insulating material, and the surface thereof is coated with asphalt.

The spirally wound electrode body 20 housed in the nonaqueous electrolyte battery is wound around a center pin 24. The spirally wound electrode body 20 is configured in a way that the positive electrode 21 and the negative electrode 22 are stacked in order with the separator 23 interposed therebetween, and spirally wound in a longitudinal direction. The positive electrode lead 25A is connected to the positive electrode 21, and a negative electrode lead 26 is connected to the negative electrode 22. As described above, the positive electrode lead 25A is welded to the sub disk 25B to be electrically connected to the battery cover 14, and the negative electrode lead 26 is welded to the battery can 11 to be electrically connected thereto, It should be understood that in the above-described configuration example of the battery, the lead is composed of the positive electrode lead 25A and the sub disk 25B, but may be provided with no sub disk 25B, and the positive electrode lead 25A may be directly connected to the disk plate 15A.

Figure 3:
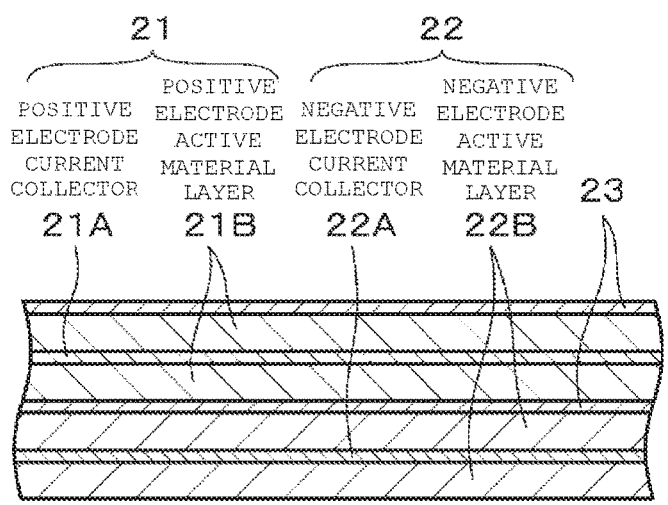
FIG. 3 is a diagram for explaining a configuration example of a battery according to an embodiment of the present disclosure.

Next, the positive electrode 21, the negative electrode 22, the separator 23, and the electrolytic solution constituting the nonaqueous electrolyte secondary battery will be sequentially described with reference to FIG. 3.

The positive electrode 21 has, for example, a structure with a positive electrode active material layer 21B provided on both surfaces of a positive electrode current collector 21A. It is to be noted that, although not shown, the positive electrode active material layer 21B may be provided only on one surface of the positive electrode collector 21A. The positive electrode current collector 21A is made from, for example, metal foil such as aluminum foil, nickel foil, or stainless steel foil. The positive electrode active material layer 21B includes, for example, a positive electrode active material capable of occluding and releasing lithium which is an electrode reactant.

The positive electrode active material layer 21B may further contain an additive, if necessary. For example, at least one of a conducting agent and a binder can be used as the additive.

As the positive electrode material capable of occluding and releasing lithium, a lithium-containing compound is suitable, for example, such as a lithium oxide, a lithium phosphorus oxide, a lithium sulfide or an intercalation compound containing lithium, and two or more thereof may be used in mixture. In order to increase the energy density, a lithium-containing compound containing lithium, a transition metal element, and oxygen (O) is preferred. Examples of such a lithium-containing compound include, for example, a lithium composite oxide that has a layered rock-salt type structure as represented by the formula (A), and a lithium composite phosphate that has an olivine-type structure as represented by the formula (B). The lithium-containing compound more preferably contains at least one selected from the group consisting of cobalt (Co), nickel, manganese (Mn), and iron as the transition metal element. Examples of such a lithium-containing compound include, for example, a lithium composite oxide that has a layered rock-salt type structure as represented by the formula (C), the formula (D) or the formula (E), a lithium composite oxide that has a spinel-type structure as represented by the formula (F), and a lithium composite phosphate that has an olivine-type structure represented by the formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \quad (A)$$

(In the formula (A), M1 represents at least one element selected from Group 2 to Group 15 excluding nickel and manganese. X represents at least one of Group 16 elements and Group 17 elements excluding oxygen. p, q, y and z represent values within the ranges of 0≤p≤1.5, 0≤q≤1.0, 0≤r≤1.0, −0.10≤y≤0.20, and 0≤z≤0.2.)

$$Li_aM2_bPO_4 \quad (B)$$

(In the formula (B), M2 represents at least one element selected from Group 2 to Group 15 elements. a and b represent values within the ranges of 0≤a≤2.0 and 0.5≤b≤2.0.)

$$Li_jMn_{(1-g-h)}Ni_gM3_hO_{(2-j)}F_k \quad (C)$$

(In the formula (C), M3 represents at least one element from the group consisting of cobalt, magnesium (Mg), aluminum, boron (B), titanium (Ti), vanadium (V), chromium (Cr), iron, copper (Cu), zinc (Ln), zirconium (Zr), molybdenum (Mo), tin (Sn), calcium (Ca), strontium (Sr) and tungsten (W). f, g, h, j and k represent values within the ranges of 0.8≤f≤1.2, 0<g<0.5, 0≤h≤0.5, g+h<1, −0.1≤j≤0.2, and 0≤k≤0.1.
It is to be noted that the composition of lithium varies depending on the state of charge/discharge, and the value off represents a value in a fully discharged state.)

$$Li_mNi_{(1-n)}M4_nO_{(2-p)}F_q \quad (D)$$

(In the formula (D), M4 represents at least one from the group consisting of cobalt, manganese, magnesium, aluminum, boron, titanium, vanadium, chromium, iron, copper, zinc, molybdenum, tin, calcium, strontium and tungsten. m, n, p, and q represent values within the ranges of 0.8≤m≤1.2, 0.005≤n≤0.5, −0.1≤p≤0.2., and 0≤q≤0.1. It is to be noted that the composition of lithium varies depending on the state of charge/discharge, and the value of m represents a value in a fully discharged state.)

$$Li_rCo_{(1-s)}M5_sO_{(2-t)}F_u \quad (E)$$

(In the formula (E), M5 represents at least one from the group consisting of nickel, manganese, magnesium, aluminum, boron, titanium, vanadium, chromium, iron, copper, zinc, molybdenum, tin, calcium, strontium and tungsten. r, s, t and u represents values within the ranges of 0.8≤r≤1.2, 0≤s<0.5, −0.1≤t≤0.2, and 0≤u≤0.1. The composition of lithium varies depending on the state of charge and discharge, and the value of r represents the value in a fully discharged state.)

$$Li_vMn_{2-w}M6_wO_xF_y \quad (F)$$

(In the formula (F), M6 represents at least one from the group consisting of cobalt, nickel, magnesium, aluminum, boron, titanium, vanadium, chromium, iron, copper, zinc, molybdenum, tin, calcium, strontium and tungsten. v, w, x and y represent values within the ranges 0.9≤v≤1.1, 0≤w≤0.6, 3.7≤x≤4.1, and 0≤y≤0.1. The composition of lithium varies depending on the state of charge and discharge, and the value of v represents the value in a fully discharged state.)

$$Li_zM7PO_4 \quad (G)$$

(In the formula (G), M7 represents at least one from the group consisting of cobalt, manganese, iron, nickel, magnesium, aluminum, boron, titanium, vanadium, niobium (Nb), copper, zinc, molybdenum, calcium, strontium, tungsten and zirconium. z represents a value within the range 0.9≤z≤1.1. The composition of lithium varies depending on the state of charge and discharge, and the value of z represents the value in a fully discharged state.)

In addition to the foregoing, other examples of the positive electrode material capable of occluding and releasing lithium also include inorganic compounds containing no lithium, such as $MnO_2$, $V_2O_5$, $V_6O_{13}$, NiS, and MoS.

The positive electrode material capable of occluding and releasing lithium may be any other than those mentioned above. In addition, two or more of the positive electrode materials exemplified above may be mixed in arbitrary combination.

For example, at least one selected from resin materials such as polyvinylidene fluoride (PVdF), polytetrafluoroethylene (PTFE), polyacrylonitrile (PAN), styrene butadiene rubber (SBR) and carboxymethyl cellulose (CMC), and copolymers mainly of the resin materials is used as the binder.

Examples of the conducting agent include, for example, carbon materials such as graphite, carbon black or Ketjen black, and one, or two or more thereof are used in mixture. Besides the carbon materials, a metal material, a conductive polymer material, or the like may be used as long as the material has conductivity.

The negative electrode 22 has, for example, a structure with a negative electrode active material layer 22B provided on both surfaces of a negative electrode current collector 22A. It is to be noted that, although not shown, the negative electrode active material layer 22B may be provided only on one surface of the negative electrode collector 22A. The negative electrode current collector 22A is made from, for example, metal foil such as copper foil, nickel foil, or stainless steel foil.

The negative electrode active material layer 22B includes one, or two or more negative electrode active materials capable of occluding and releasing lithium. The negative electrode active material layer 22B may further contain an additive such as a binder and a conducting agent, if necessary.

It should be understood that in this nonaqueous electrolyte battery, the electrochemical equivalent of the negative electrode 22 or the negative electrode active material is larger than the electrochemical equivalent of the positive electrode 21, and theoretically, lithium metal is preferably kept from being precipitated on the negative electrode 22 in the course of charging.

Examples of the negative electrode active material include, for example, carbon materials such as non-graphitizable carbon, graphitizable carbon, graphite, pyrolytic carbon, coke, glassy carbon, a fired body of organic polymer compound, carbon fibers, or activated carbon. Among the foregoing materials, examples of the coke include pitch coke, needle coke, and petroleum coke. The fired body of organic polymer compound refers to product carbonized by firing polymer materials such as phenolic resins or furan resins at appropriate temperatures, and some of the products are classified in non-graphitizable carbon or graphitizable carbon. These carbon materials are preferred because the crystal structures produced during charging/discharging undergo little change, thereby making it possible to achieve a high charge/discharge capacity, and making it possible to achieve favorable cycle characteristics. In particular, graphite is preferred because of its large electrochemical equivalent, which allows for the achievement of a high energy density. In addition, non-graphitizable carbon is preferred because excellent cycle characteristics are achieved. Furthermore, materials that are low in charge/discharge potential, specifically materials that are close in charging/discharging potential to lithium metal, are preferred because the materials can easily achieve increases in the energy density of the battery.

In addition, examples of another negative electrode active material capable of increasing the capacity also include a material containing at least one of a metal element and a metalloid element as a constituent element (for example, an alloy, a compound, or a mixture). This is because the use of such a material can achieve a high energy density. In particular, the use together with a carbon material is more preferred because a high energy density can be achieved, and because excellent cycle characteristics can be achieved. It should be understood that, in the present disclosure, examples of the alloy includes, in addition to alloys composed of two or more metal elements, alloys containing one or more metal elements and one or more metalloid elements. In addition, the alloy may also contain a nonmetallic element. Examples of the compositional structure include a solid solution, a eutectic (eutectic mixture), an intermetallic compound, or a mixture of two or more thereof.

Examples of such a negative electrode active material include, for example, a metal element or a metalloid element capable of forming an alloy with lithium. Specifically, the examples include magnesium, boron, aluminum, titanium, gallium (Ga), indium (In), silicon (Si), germanium (Ge), tin, lead (Pb), bismuth (Bi), cadmium (Cd) silver (Ag), zinc, hafnium (Hf), zirconium, yttrium (Y), palladium (Pd) or platinum (Pt). These may be crystalline or amorphous.

As the negative electrode active material, a material containing, as a constituent element, a metal element or a metalloid element of Group 4B in the short periodic table is preferred, and more preferred is a material containing at least one of silicon and tin as a constituent element. This is because silicon and tin are high in ability to occlude and release lithium, and thus capable of achieving a high energy density. Examples of such a negative electrode active material include: a simple substance, an alloy, or a compound of silicon; a simple substance, an alloy, or a compound of tin; and a material that at least partially has a phase of one, or two or more thereof.

Examples of the alloy of silicon include, for example, an alloy containing, as a second constituent element other than silicon, at least one from the group consisting of tin, nickel, copper, iron, cobalt, manganese, zinc, indium, silver, titanium, germanium, bismuth, antimony (Sb) and chromium. Examples of the alloy of tin include, for example, an alloy containing, as a second constituent element other than tin, at least one from the group consisting of silicon, nickel, copper, iron, cobalt, manganese, zinc, indium, silver, titanium, germanium, bismuth, antimony and chromium.

Examples of the compound of tin or the compound of silicon include, for example, a compound containing oxygen or carbon, and may contain, in addition to tin or silicon, the second constituent element described above.

Above all, as a Sn-based negative electrode active material, a SnCoC-containing material is preferred which contains cobalt, tin, and carbon as constituent elements, where the content of carbon is 9.9% by mass or more and 29.7% by mass or less, and the proportion of cobalt to the total of tin and cobalt is 30% by mass or more and 70% by mass or less. This is because in such a composition range, a high energy density can be achieved, and excellent cycle characteristics can be achieved.

This SnCoC-containing material may further contain other constituent elements, if necessary. The other constituent elements preferably include, for example, silicon, iron, nickel, chromium, indium, niobium, germanium, titanium, molybdenum, aluminum, phosphorus (P), gallium or bismuth, and the material may contain two or more thereof. This is because the capacity or cycle characteristics can further improved.

It should be understood that this SnCoC-containing material has a phase containing tin, cobalt, and carbon, and this phase preferably has a low crystalline or amorphous structure. In addition, in this SnCoC-containing material, the carbon as a constituent element is preferably at least partially bonded to a metal element or a metalloid element which is another constituent element. This is because, while deterioration of cycle characteristics is believed to be caused by aggregation or crystallization of tin or the like, the carbon is bonded to another element, thereby making it possible to suppress such aggregation or crystallization.

Examples of a measurement method for examining the bonding state of the element include, for example, an X-ray photoelectron spectroscopy (XPS). In accordance with XPS, the peak of the 1s orbit (C1s) of carbon appears at 284.5 eV, in the case of graphite, in a device calibrated in terms of energy so that the peak of the 4f orbital (Au4f) of a gold atom is obtained at 84.0 eV In addition, in the case of surface contaminated carbon, the peak appears at 284.8 eV In contrast, when the carbon element increases in charge density, the peak of C1s appears in a lower range than 284.5 eV, for example, when carbon is bonded to a metal element or a metalloid element. More specifically, when the peak of a synthetic wave of C1s obtained for the SnCoC-containing material appears in a lower range than 284.5 eV, the carbon included in the SnCoC-containing material is at least partially bonded to a metal element or a metalloid element as another constituent element.

It should be understood that in the XPS measurement, for example, the peak of C1s is used for the correction of the energy axis of the spectrum. Typically, surface contaminated carbon is present on the surface, the peak of C1s of surface contaminated carbon is determined to be 284.8 eV, which is regarded as an energy reference. In the XPS measurement, the waveform of the peak of C1s is obtained in a form including the peak of the surface contaminated carbon and the peak of the carbon in the SnCoC-containing material, and thus, the analysis with the use of, for example, commercially available software separates the peak of the surface contaminated carbon from the peak of the carbon in the SnCoC-containing material. In the analysis of the waveform, the position of the main peak present on the lowest binding energy side is determined to be an energy reference (284.8 eV).

Other negative electrode active materials also include, for example, a metal oxide or a polymer compound capable of occluding and releasing lithium. Examples of the metal oxide include, for example, a lithium titanium oxide containing titanium and lithium such as lithium titanate ($Li_4Ti_5O_{12}$), an iron oxide, a ruthenium oxide, or a molybdenum oxide. Examples of the polymer compound include, for example, polyacetylene, polyaniline, or polypyrrole.

As the binder, for example, at least one is used which is selected from resin materials such as polyvinylidene fluoride, polytetrafluoroethylene, polyacrylonitrile, styrene butadiene rubber, and carboxymethyl cellulose, and copolymers mainly composed of the resin materials, and the like. As the conducting agent, the same carbon material as the positive electrode active material layer 21B, or the like can be used.

The separator 23 is intended to separate the positive electrode 21 and the negative electrode 22, thereby allowing passage of lithium ions while preventing short circuits due to the current caused by contact between the both electrodes. The separator is composed of, for example, a porous membrane made from a resin such as polytetrafluoroethylene, polypropylene, or polyethylene, and may be adapted to have a structure obtained by laminating two or more of such porous membranes. Above all, a porous membrane made from polyolefin is preferred because the membrane has an excellent short circuit-prevention effect, and can make an improvement in battery safety by a shutdown effect. In particular, polyethylene is preferred as a material constituting the separator 23, because polyethylene can achieve the shutdown effect within a range of 100° C. or higher and 160° C. or lower, and also has excellent electrochemical stability. Besides, a material can be used which is obtained by copolymerizing or blending a chemically stable resin with polyethylene or polypropylene. Alternatively, the porous membrane may have a structure of three or more layers, where a polypropylene layer, a polyethylene layer, and a polypropylene layer are sequentially laminated.

In addition, for the separator 23, a resin layer may be provided on one or both surfaces of the porous membrane which serves as a base material. The resin layer is a porous matrix resin layer with an inorganic substance supported. Thus, oxidation resistance can be obtained, and deterioration of the separator 23 can be suppressed. For example, polyvinylidene fluoride, hexafluoropropylene (HFP), polytetrafluoroethylene or the like can be used as the matrix resin, and it is also possible to use copolymers thereof.

Examples of the inorganic substance can include a metal, a semiconductor, or oxides or nitrides thereof. For example, examples of the metal can include aluminum and titanium, and examples of the semiconductor can include silicon and boron. In addition, the inorganic substance preferably has substantially no conductivity and a high heat capacity. This is because when the heat capacity is high, the substance is useful as a heat sink in the case of current heating, thereby making it possible to further suppress thermal runaway of the battery. Examples of such an inorganic substance include oxides or nitrides such as alumina ($Al_2O_3$), boehmite (monohydrate of alumina), talc, boron nitride (BN), aluminum nitride (AlN), titanium dioxide ($TiO_2$), and silicon oxide (SiOx).

The particle size of the inorganic substance preferably falls within the range of 1 nm to 10 μm. If the particle size is smaller than 1 nm, the inorganic substance is difficult to obtain, and even if the substance is available, the substance is not suitable in terms of cost. This is because If the particle size is larger than 10 μm, the distance between the electrodes is increased, thereby achieving an insufficient amount of active material in a limited space, and thus decreasing the battery capacity.

As a method for forming the resin layer, the resin layer can be formed in a way that a slurry composed of the matrix resin, a solvent, and the inorganic substance is applied onto the base material (porous membrane), passed through a poor solvent of the matrix resin and a good solvent bath of the solvent to cause phase separation, and then dried.

In addition, the piercing strength of the separator 23 preferably falls within the range of 100 gf to 1000 gf. More preferably, the piercing strength is 100 gf to 480 gf. This is because If the piercing strength is lower, a short circuit may occur, whereas if the piercing strength is higher, the ion conductivity will decrease.

The air permeability of the separator 23 preferably falls within the range of 30 sec/100 cc to 1000 sec/100 cc. More preferably, the air permeability is 30 sec/100 cc to 680 sec/100 cc. This is because If the air permeability is lower, a short circuit may occur, whereas if the air permeability is higher, the ion conductivity will decrease.

It should be understood that the porous film as a base material may contain therein the above-described inorganic substance.

The separator 23 is impregnated with an electrolytic solution which is a liquid electrolyte. The electrolytic solution includes a solvent and an electrolyte salt dissolved in the solvent. In order to improve the battery characteristics, the electrolytic solution may contain known additives.

As the solvent, a cyclic carbonate such as ethylene carbonate or propylene carbonate can be used, and it is preferable to use one of ethylene carbonate and propylene carbonate, particularly, use the both in mixture. This is because cycle characteristics can be improved.

As the solvent, and in addition to the foregoing cyclic carbonate esters, it is preferable to use, in mixture, a chain carbonate such as diethyl carbonate, dimethyl carbonate, ethyl methyl carbonate, or methyl propyl carbonate. This is because high ionic conductivity can be achieved.

The solvent preferably further contains 2,4-difluoroanisole or vinylene carbonate. This is because 2,4-difluoroanisole can improve the discharge capacity, whereas vinylene carbonate can improve cycle characteristics. Therefore, it is preferable to use the foregoing compounds in mixture, because the discharge capacity and cycle characteristics can be improved.

Besides the foregoing, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, or trimethyl phosphate.

It should be understood that compounds in which at least some hydrogen of these nonaqueous solvents is substituted with fluorine may be preferred, because the compounds can sometimes improve the reversibility of the electrode reactions depending on the types of the electrodes to be combined.

Examples of the electrolyte salt include, for example, a lithium salt, and one type of electrolyte salt may be used alone, or two or more types of electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, or LiBr. Above all, $LiPF_6$ is preferred, because $LiPF_6$ can achieve high ionic conductivity and improve cycle characteristics.

For example, the nonaqueous electrolyte battery may be designed such that the open circuit voltage (that is, a battery voltage) obtained when the battery is completely charged is, for example, 2.80 V or higher and 6.00V or lower, or 3.60 V or higher and 6.00 V or lower, preferably 4.25 V or higher and 6.00 V or lower, or 4.20 V or higher and 4.50 V or lower, further preferably 4.30 V or higher and 4.55 V or lower. In the case where the open circuit voltage obtained when the battery is completely charged is made 4.25 V or higher in the battery using a layered rock salt-type lithium composite oxide or the like as a positive electrode active material, for example, as compared with a 4.20 V battery, the amount of lithium released per unit mass is increased even in the case of the same positive electrode active material, and accordingly, the amounts of the positive electrode act material and the negative electrode active material are adjusted, thereby providing a high energy density.

In the nonaqueous electrolyte secondary battery configured as described above, on charging, for example, lithium ions are released from the positive electrode active material layer 21B, and occluded by the negative electrode active material layer 22B through the electrolytic solution. Further, on discharging, for example, lithium ions are released from the negative electrode active material layer B, and occluded by the positive electrode active material layer 21B through the electrolytic solution.

The above-described secondary battery is manufactured, for example, as follows.

First, a positive electrode material which is capable of lithium doping and dedoping, a conductive agent, and a binder are mixed to prepare a positive electrode mixture, and the positive electrode mixture is dispersed in a mixed solvent to provide a positive electrode mixture slurry. Next, the positive electrode mixture slurry is applied to the positive electrode current collector 21A, dried, and then subjected to compression molding to prepare the positive electrode 21. Thereafter, the positive electrode lead 25A is connected to the positive electrode current collector 21A by ultrasonic welding, spot welding, or the like.

In addition, a negative electrode material which is capable of lithium doping and dedoping and a binder are mixed to prepare a negative electrode mixture, and the negative electrode mixture is dispersed in a mixed solvent to provide a negative electrode mixture slurry. Next, the negative electrode mixture slurry is applied to the negative electrode current collector 22A, dried, and then subjected to compression molding to prepare the negative electrode 22. Thereafter, the negative electrode lead 26 is connected to the negative electrode collector 22A by ultrasonic welding, spot welding, or the like.

Then, the positive electrode 21 and the negative electrode 22 are wound a number of times with the separator 23 interposed therebetween, thereby preparing a spirally wound electrode body. Thereafter, the spirally wound electrode body is sandwiched between the pair of insulating plates 12 and 13, housed inside the battery can 11, and the positive electrode lead 25A is electrically connected to the protrusion 18 of the disk plate 15A via the sub disk 25B, and the negative electrode lead 26 is electrically connected to the battery can 11.

In addition, an electrolytic solution is prepared by dissolving an electrolyte salt in a solvent. Thereafter, the electrolytic solution is injected into the inside of the battery can 11 to impregnate the separator 23. Subsequently, the safety mechanism 15 and the battery cover 14 are fixed to the open part of the battery can 11 by crimping via the gasket 17. In this way, a lithium ion battery is completed. Further, although omitted in the above-described explanation, actually, a resin ring washer is attached to the battery cover 14, and the whole battery is covered with a resin tube.

Figure 4A:
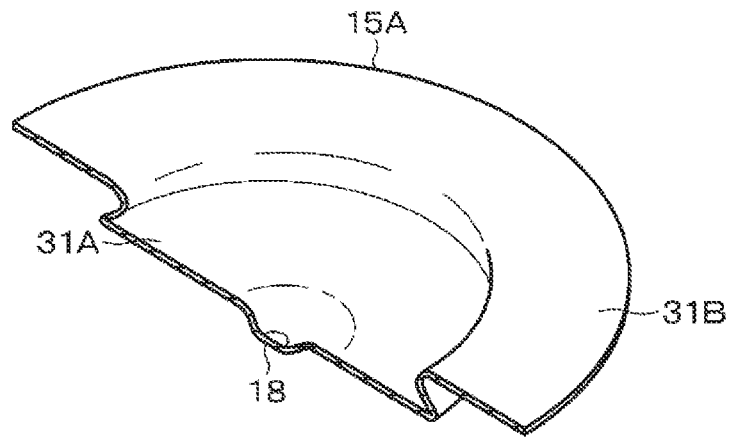
FIG. 4A through FIG. 4C are diagrams for explaining parts constituting a safety mechanism according to an embodiment of the present disclosure.
Figure 4B:
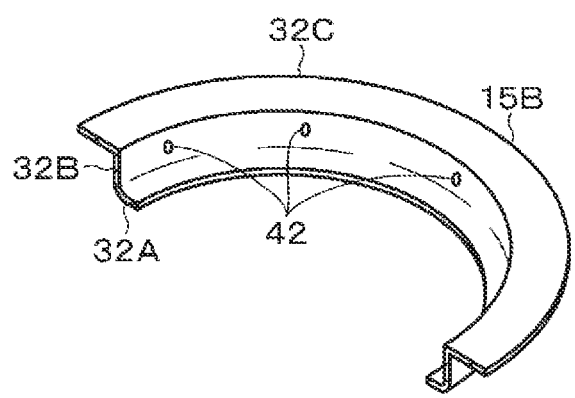
Figure 4C:
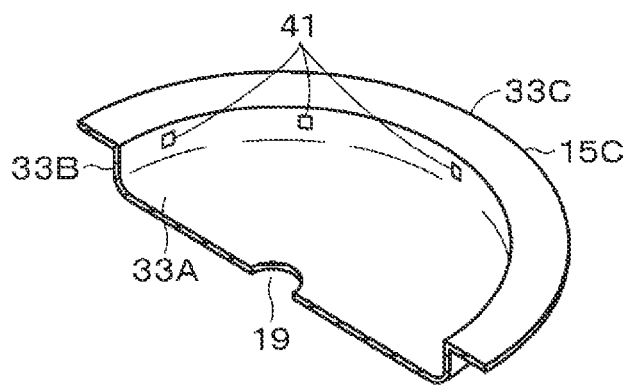

Next, the above-described safety mechanism 15 will be described in more detail. FIGS. 4A to 4C are perspective views of halves of parts constituting the safety mechanism 15, where FIG. 4A is a perspective view of a half of the disk plate 15A, FIG. 4B is a perspective view of a half of the disk holder 15B, and FIG. 4C is a perspective view of a half of the shutoff disk 15C.

The disk plate 15A has, for example, a dish shape as a whole, and has a circular bottom 31A and a flange 31B that slightly stands from the peripheral edge of the bottom 31A and extends outward, in the substantially central part of the bottom 31A, a protrusion part 18 protruding downward is formed.

The disk holder 15B has a ring-shaped bottom 32A, a wall 32B that stands upward from the outer peripheral edge of the bottom 32A, and a flange 32C that extends outward from the end of the wall 32B.

The shutoff disk 15C has a circular bottom 33A, a wall 33B that stands upward from the peripheral edge of the bottom 33A, and a flange 33C that extends outward from the end of the wall 33B. The disk plate 15A and the shutoff disk 15C are fitted with the disk holder 15B interposed therebetween.

As described above, the disk plate 15A and the shutoff disk 15C are kept fitted with the disk holder 15B interposed therebetween. However, there may be variations in dimension for each part, and there is thus a possibility that the respective parts fitted may be made unstable due to the variations in dimension. Therefore, the disk holder 15B and the shutoff disk 15C according to the present embodiment have protrusions formed. For example, the inner side of the wall 33B of the shutoff disk 15C has a plurality of first protrusions 41 formed. That the plurality of first protrusions 41 is preferably formed at substantially equal intervals, for example, in consideration of convenience in the manufacturing process. In addition, for example, the inner side of the wall 32B of the disk holder 15B has a plurality of second protrusions 42 formed. That the plurality of second protrusions 42 is preferably formed at substantially equal intervals, for example, in consideration of convenience in the manufacturing process. In the following description, an explanation will be provided with the assumption that the plurality of first protrusions 41 is formed at substantially equal intervals. Likewise, an explanation will be provided with the assumption that the plurality of second protrusions 42 is formed at substantially equal intervals.

It should be understood that the protrusions may serve as projections or elastically deformable claws, and not to be considered limited to any specific shape or the like, and according to the present embodiment, an explanation will be provided with the assumption that the first protrusions 41 serve as claws, whereas the second protrusions 42 serve as projections.

Providing the first protrusion 41 and the second protrusion 42 brings the respective parts into point contact instead of surface contact when the respective parts are fitted, thereby making it possible to reduce the resistance in assembling. For this reason, stable fit can be kept by absorbing variations in dimension for each part. However, when a pair of first protrusions 41 and a pair of second protrusions 42 are arranged in a straight line, it is not possible to ensure a pressure buffer zone for releasing excess pressure at the time of fitting (a clearance that absorbs variations in size for each part). For this reason, in some cases, defective fit occurs, and there is a possibility that the height dimension of the safety mechanism 15 may vary. Due to this variation in dimension, there is a possibility that the operation of the safety mechanism 15 may vary.

This respect will be described with reference to FIG. 5. When the shutoff disk 15C and the disk holder 15B fitted are viewed from above, the sites of the wall 33B and the wall 32B can be mutually regarded as circumferences of concentric circles. For example, the site of the wall 33B can be regarded as a first circumference CL1, and the site of the wall 32B can be regarded as a second circumference CL2. It is to be noted that the circumference is not necessarily a strict circle, and may be slightly distorted, and the center of the first circumference CL1 and the center of the second circumference CL2 may be slightly shifted from each other. In addition, for the sake of explanation, the first circumference CL1 and the second circumference CL2 are illustrated separately in FIG. 5 (the same applies to FIGS. 6 to 8), but actually, the circumferences are close to each other.

The first protrusions 41 formed on the wall 33B are located at substantially equal intervals along the first circumference CL1. The phrase of "on the first circumference" means, for example, at least a part of the first protrusion 41 in contact with the first circumference CL1. In addition, the second protrusions 42 formed on the wall 32B are located at substantially equal intervals along the second circumference CL2. The phrase of "on the second circumference" means, for example, at least a part of the second protrusion 42 in contact with the second circumference CL2. In the example shown in FIG. 5, four first protrusions 41 are formed, and each first protrusion is indicated by a rectangular mark. In addition, four second protrusions 42 are formed, and each second protrusion is indicated by a circle mark.

In this regard, a diagonal line passing through the center of the circle and including the first circumference CL1 and the second circumference CL2 is defined. In FIG. 5, two diagonal lines and DL2 are shown.

Figure 5:
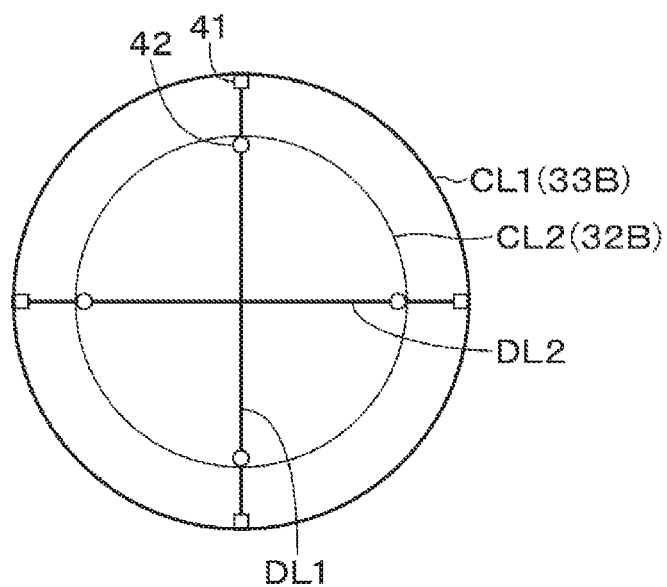

As shown in FIG. 5, for example, in the case where four protrusions (two first protrusions 41 and two second protrusions 42) are located on the diagonal line DL1, it is impossible to ensure a buffer zone as described above. For this reason, at the time of assembling the safety mechanism 15, defective fit occurs, and for example, there is a possibility that the height (total height) of the safety mechanism 15 may be larger than the standard value.

Therefore, when the number of the first protrusions 41 and second protrusions 42 located (present) on the diagonal lines including on the first circumference CL1 and on the second circumference CL2 is preferably 3 or less (in this case, the number may include 0). If the maximum number is 3, a pressure buffer zone can be ensured.

More specifically, on a diagonal line passing through at least one first protrusion 41 or at least one second protrusion 42, the number of first protrusions 41 and second protrusion 42 located on the diagonal line is preferably 3 or less. Even in this case, the total number of first protrusions 41 and second protrusions 42 located on the diagonal line is 3 or less at a maximum, thus making it possible to ensure a pressure buffer zone.

In addition, the mechanism may be configured such that the first protrusion 41 and the second protrusion 42 are located on one side of the diagonal line, whereas the first protrusion 41 and the second protrusion 42 are not present on the other side of the diagonal line.

Alternatively, the mechanism may be configured such that the first protrusion 41 and the second protrusion 42 are located on one side of the diagonal line, whereas the first protrusion 41 or the second protrusion 42 is located on the other side of the diagonal line.

In addition, at least one of the number of first protrusions 41 and the number of second protrusions 42 may be an odd number. Furthermore, the number of first protrusions 41 and the number of second protrusions 42 may both be odd numbers. For example, in the case where the first protrusions 41 are located at substantially equal intervals along the first circumference CL1, whereas the second protrusions 42 are located at substantially equal intervals along the second circumference CL2, it will be assumed that the first protrusions 41 and the second protrusions 42 are located on one side along a certain diagonal line.

When the number of first protrusions 41 and the number of the second protrusions 42 are both even numbers, there is 2 as the greatest common divisor, the first protrusion 41 and the second protrusion 42 are also located every 180 degrees, that is, an the opposite side on the diagonal line described above, and the number of the first protrusions 41 and second protrusion 42 located on the diagonal line is 4. For this reason, it becomes impossible to ensure a pressure buffer zone. Therefore, at least one of the number of first protrusions 41 and the number of second protrusions 42 is preferably an odd number.

According to the embodiment described above, a pressure buffer zone in the configuration of the battery can be ensured. Therefore, defective fit can be prevented from occurring when the respective parts of the safety mechanism 15 are fitted, and the safety mechanism 15 can be thus prevented from varying in dimension. In addition, the respective parts of the safety mechanism 15 can be reliably fitted so that the height dimensions of the parts fall within a predetermined value, the safety mechanism 15 can thus operate stably, and the safe operation can be prevented from varying.

Next, examples of the present disclosure will be described, but the present disclosure is not to be considered limited to the following examples.

In the present example, a cylindrical lithium ion secondary battery of 18650 type (18 mm in diameter, 65 mm in height) was used.

In the present embodiment, the diameter of the disk plate 15A (for example, the diameter of the bottom 31A) fitted to the inside of the disk holder 15B (the inside of the wall 32B) was set to +5% from the standard value, and an experiment was made under the unfavorable condition (with difficulty in fitting). In addition, in the present embodiment, the diameter of the shutoff disk 15C (for example, the diameter of the bottom 33A) with the disk holder 15B fitted thereto was set to −5% from the standard value, and an experiment was made under the unfavorable condition (with difficulty in fitting).

The plurality of first protrusions 41 was formed on the inner side of the wall 33B so as to achieve substantially equal intervals. The plurality of second protrusions 42 was formed on the inner side of the wall 32B so as to achieve substantially equal intervals. The numbers of samples in a comparative example and respective examples were each 50.

In the case of varying the number of the first protrusions 41 of the shutoff disk 15C and the number of the second protrusions 42 of the disk holder 15B, the following evaluation items were evaluated with the use of a process capability index (in the present example, a Cpk value (also referred to as a process capability value) as will be described later).

[Evaluation Item]
The height (total height) of the safety mechanism 15
The shutoff pressure of the safety mechanism 15 (the pressure of shutting off the protrusion part 18 of the disk plate 15A and the sub disk 25B)

In this regard, the process capability will be supplementarily described. The process capability refers to an ability related to process quality, which is also referred to as a process quality achievement capability, and indicates the ability to achieve a quality with a degree of variation in a process in a stable state. The ability to produce a produce that meets quality standards is referred as a process capability.

The numerical value for evaluating the process capability serves as a process capability index.

As the process capability index, a Cp value or a Cpk value (Process Capability Index) is used. The Cp value is obtained by the following formula (1).

$$Cp=(\text{upper limit of standard}-\text{lower limit of standard})/6\sigma(\text{where } \sigma \text{ represents standard deviation}) \quad (1)$$

When variation data at the time of examination is shown as a normal distribution graph, the Cpk value is obtained as numerical data associated with the average value, when the distribution deviates from the average value. The Cpk value is obtained by the following formula (2).

$$Cpk=(1-k)*Cp(\text{where } k \text{ is the degree of bias}) \quad (2)$$

The process index with respect to the standard can be confirmed by obtaining Cp, Cpk as numerical data.

In general, the following determination is made in accordance with the value of the process capability index. It is to be noted that in the following example, the Cp value will be described by way of example, but the same applies to the Cpk value.

Cp ≥ 1.67 ... the processing capability is more than adequate.
1.67 > Cp ≥ 1.33 ... the processing capability is adequate.
1.33 > Cp ... the process capability is not adequate or inadequate.

Therefore, according to the present example, also with respect to each standard value, "x" was assigned to a product with a process capability of less than 1.33, "○" was to a product with a process capability from 1.33 to less than 1.67, and "⊙" was assigned to a product that satisfies 1.67 (1.67 or more).

The results are shown in Table 1 below:

TABLE 1

|  | Projection (Second Protrusion) | Claw (First Protrusion) | Total Height of Safety Mechanism | Shutoff Pressure |
|---|---|---|---|---|
| Comparative Example 1 | 16 | 6 | × | × |
| Example 1 | 15 | 6 | ○ | ⊙ |
| Example 2 | 13 | 6 | ⊙ | ⊙ |
| Example 3 | 11 | 6 | ⊙ | ⊙ |
| Example 4 | 9 | 6 | ○ | ○ |
| Example 5 | 7 | 6 | ○ | ○ |
| Example 6 | 16 | 5 | ⊙ | ⊙ |
| Example 7 | 16 | 3 | ⊙ | ⊙ |
| Example 8 | 13 | 5 | ⊙ | ⊙ |

The positional relationships between the first protrusions 41 and the second protrusions 42 corresponding to Comparative Example 1 and Examples 1 to 8 in Table 1 are respectively shown in FIGS. 6, and FIGS. 7A to 7D and FIGS. 8A to 8D.

Figure 6:
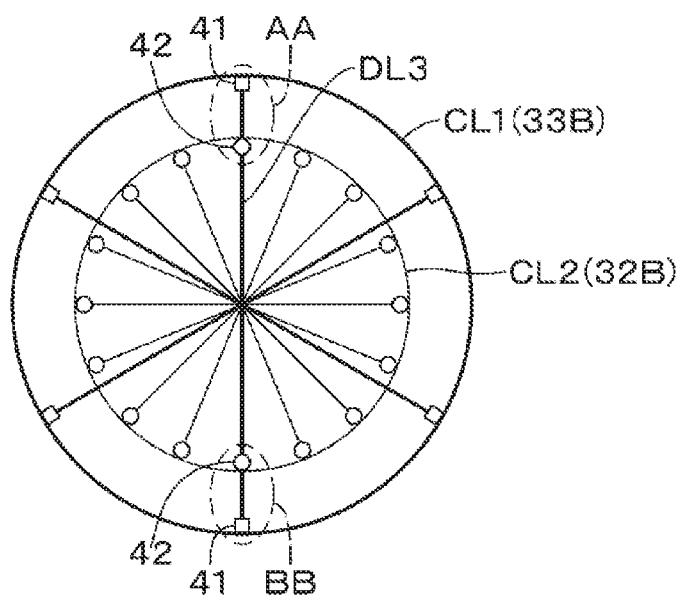
FIG. 6 is a diagram for explaining the positional relationship between a first protrusion and a second protrusion corresponding to a comparative example.

Comparative Example 1 is an example in which the number of the first protrusions 41 and the number of the second protrusions 42 are both even numbers, specifically, an example in which the number of the first protrusions 41 is 6, whereas the number of the second protrusions 42 is 16. As shown in FIG. 6, in this example, when the first protrusion 41 and the second protrusion 42 are located on one side of a predetermined diagonal line DL3 (a site denoted by reference symbol AA) along the diagonal line DL3, the first protrusion 41 and the second protrusion 42 are also located on the other side of the diagonal line DL3 (a site denoted by reference symbol BB). More specifically, the number of the first protrusions 41 and second protrusions 42 located on the diagonal line DL3 is 4, thereby making it impossible to ensure a pressure buffer zone, It has been confirmed that the process capability index in Comparative Example 1 is regarded as "×" for both the total height and the shutoff pressure.

It should be understood that also in this example, if the first protrusion 41 and the second protrusion 42 are not located on one side of the diagonal line DL3, the number of the first protrusions 41 and second protrusions 42 on the diagonal line DL3 can be prevented from being 4. However, some of the first protrusions 41 and the second protrusions 42 are extremely small in size, and thus, in such a case, it is practically difficult and not realistic to assemble the safety mechanism 15 while visually confirming the locations of the first protrusions 41 and second protrusions 42.

Figure 7A:
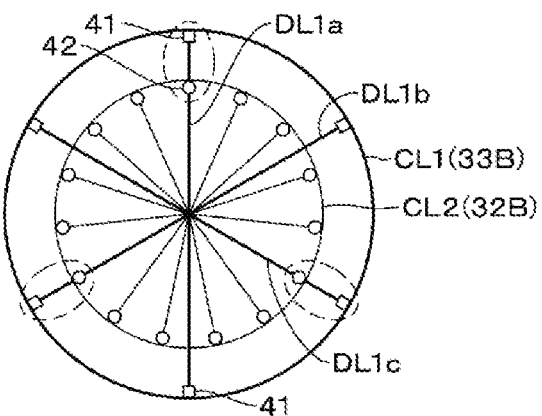
FIGS. 7A to 7D are diagrams for explaining the positional relationship between a first protrusion and a second protrusion according to an embodiment of the present technology.

Example 1 is an example in which the number of the first protrusions 41 is an even number, whereas the number of the second protrusions 42 is an odd number, specifically, an example in which the number of the first protrusions 41 is 6, whereas the number of the second protrusions is 15. As shown in FIG. 7A, in this example, when the first protrusion 41 and the second protrusion 42 are located on one side of a predetermined diagonal line DL1a along the diagonal line DL1a, only the first protrusion 41 is located on the other side of the diagonal line DL1a. The same applies to other diagonal lines DL1b and DL1c. More specifically, the number of the first protrusions 41 and second protrusions 42 located on the diagonal line DL1a is 3 at a maximum, thereby making it possible to ensure a pressure buffer zone. It has been confirmed that the process capability index in Example 1 is regarded as "○" for the total height, and "⊙" for the shutoff pressure.

Figure 7B:
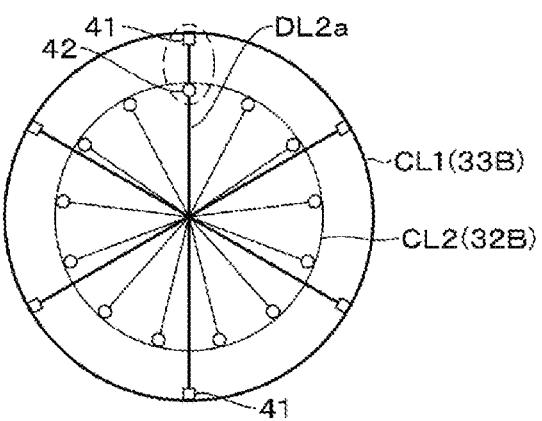

Example 2 is an example in which the number of the first protrusions 41 is an even number, whereas the number of the second protrusions 42 is an odd number, specifically, an example in which the number of the first protrusions 41 is 6, whereas the number of the second protrusions is 13. As shown in FIG. 7B, in this example, when the first protrusion 41 and the second protrusion 42 are located on one side of a predetermined diagonal line DL2a along the diagonal line DL2a, only the first protrusion 41 is located on the other side of the diagonal line DL2a. More specifically, the number of the first protrusions 41 and second protrusions 42 located on the diagonal line DL2a is 3 at a maximum, thereby making it possible to ensure a pressure buffer zone. Furthermore, the diagonal line on which the number of the first protrusions 41 and second protrusions 42 is 3 is only the diagonal line DL2a. It has been confirmed that the process capability index in Example 2 is regarded as "⊙" for both the total height and the shutoff pressure.

Figure 7C:
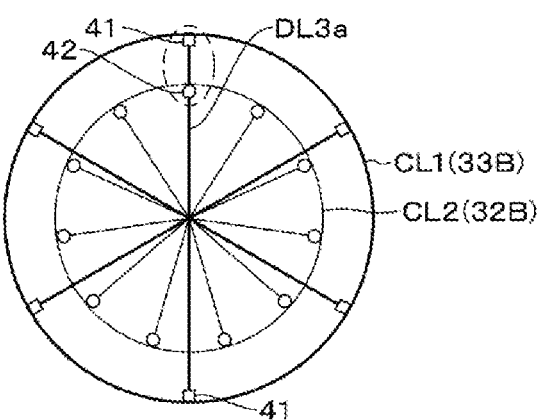

Example 3 is an example in which the number of the first protrusions 41 is an even number, whereas the number of the second protrusions 42 is an odd number, specifically, an example in which the number of the first protrusions 41 is 6, whereas the number of the second protrusions is 11. As shown in FIG. 7C, in this example, when the first protrusion 41 and the second protrusion 42 are located on one side of a predetermined diagonal line DL3a along the diagonal line DL3a, only the first protrusion 41 is located on the other side of the diagonal line DL3a. More specifically, the number of the first protrusions 41 and second protrusions 42 on the diagonal line DL3a is 3 at a maximum, thereby making it possible to ensure a pressure buffer zone. Furthermore, the diagonal line on which the number of the first protrusions 41 and second protrusions 42 is 3 is only the diagonal line DL3a. It has been confirmed that the process capability index in Example 3 is regarded as "⊙" for both the total height and the shutoff pressure.

Figure 7D:
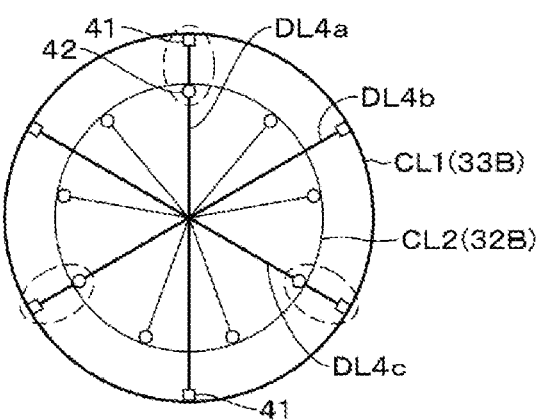

Example 4 is an example in which the number of the first protrusions 41 is an even number, whereas the number of the second protrusions 42 is an odd number, specifically, an example in which the number of the first protrusions 41 is 6, whereas the number of the second protrusions is 9. As shown in FIG. 7D, in this example, there is a site where the first protrusion 41 and the second protrusion 42 are located on one side of a diagonal line (DL4a, DL4b, DL4c) every 120 degrees corresponding to the greatest common divisor of 3 with respect to the respective protrusions, while only the first protrusion 41 is located on the other side of the diagonal line. More specifically, the number of the first protrusions 41 and second protrusions 42 located on each of the diagonal lines DL4a, DL4b, DL4c is 3 at a maximum, thereby making it possible to ensure a pressure buffer zone.

It has been confirmed that the process capability index in Example 4 is regarded as "○" for both the total height and the shutoff pressure.

Figure 8A:
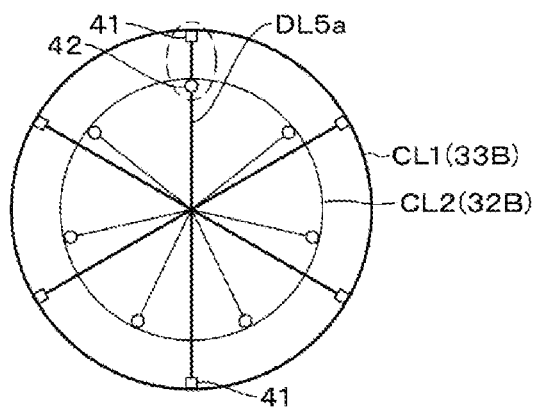
FIGS. 8A to 8D are diagrams for explaining a positional relationship between a first protrusion and a second protrusion according to an embodiment of the present technology.

Example 5 is an example in which the number of the first protrusions 41 is an even number, whereas the number of the second protrusions 42 is an odd number, specifically, an example in which the number of the first protrusions 41 is 6, whereas the number of the second protrusions 42 is 7. As shown in FIG. 8A, in this example, when the first protrusion 41 and the second protrusion 42 are located on one side of a predetermined diagonal line DL5a along the diagonal line DL5a, only the first protrusion 41 is located on the other side of the diagonal line DL5a. More specifically, the number of the first protrusions 41 and second protrusions 42 on the diagonal line DL5a is 3 at a maximum, thereby making it possible to ensure a pressure buffer zone. It has been confirmed that the process capability index in Example 5 is regarded as "○" for both the total height and the shutoff pressure.

Figure 8B:
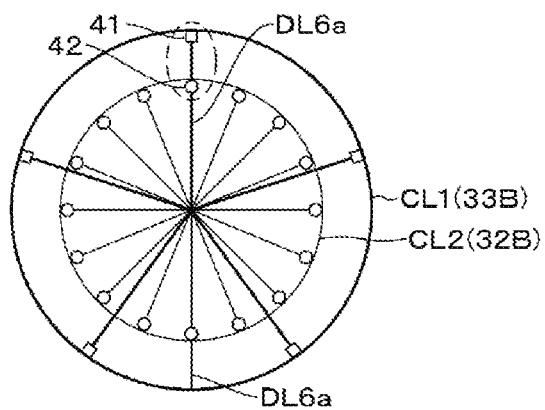

Example 6 is an example in which the number of the first protrusions 41 is an odd number, whereas the number of the second protrusions 42 is an even number, specifically, an example in which the number of the first protrusions 41 is 5, whereas the number of the second protrusions is 16. As shown in FIG. 8B, in this example, when the first protrusion 41 and the second protrusion 42 are located on one side of a predetermined diagonal line DL6a along the diagonal line DL6a, only the second protrusion 42 is located on the other side of the diagonal line DL6a. More specifically, the number of the first protrusions 41 and second protrusions 42 on the diagonal line DL6a is 3 at a maximum, thereby making it possible to ensure a pressure buffer zone. Furthermore, the diagonal line on which the number of the first protrusions 41 and second protrusions 42 is 3 is only the diagonal line DL6a. It has been confirmed that the process capability index in Example 6 is regarded as "⊙" for both the total height and the shutoff pressure.

Figure 8C:
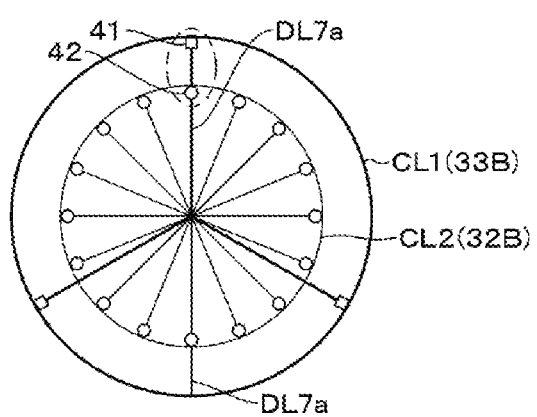

Example 7 is an example in which the number of the first protrusions 41 is an odd number, whereas the number of the second protrusions 42 is an even number, specifically, an example in which the number of the first protrusions 41 is 3, whereas the number of the second protrusions is 16. As shown in FIG. 8C, in this example, when the first protrusion 41 and the second protrusion 42 are located on one side of a predetermined diagonal line DL7a along the diagonal line DL7a, only the second protrusion 42 is located on the other side of the diagonal line DL7a. More specifically, the number of the first protrusions 41 and second protrusions 42 located on the diagonal line DL7a is 3 at a maximum, thereby making it possible to ensure a pressure buffer zone. Furthermore, the diagonal line on which the number of the first protrusions 41 and second protrusions 42 is 3 is only the diagonal line DL7a. It has been confirmed that the process capability index in Example 7 is regarded as "⊙" for both the total height and the shutoff pressure.

Figure 8D:
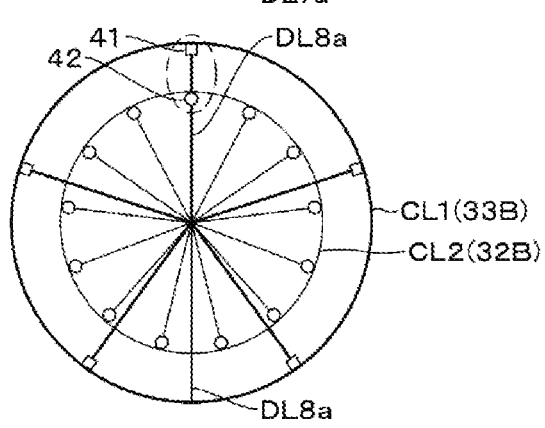

Example 8 is an example in which the number of the first protrusions 41 and the number of the second protrusions 42 are both odd numbers, specifically, an example in which the number of the first protrusions 41 is 5, whereas the number of the second protrusions is 13. As shown in FIG. 8D, in this example, when the first protrusion 41 and the second protrusion 42 are located on one side of a predetermined diagonal line DL8a along the diagonal line DL8a, the first protrusion 41 and the second protrusion 42 are not present on the other side of the diagonal line DL8a. More specifically, the number of the first protrusions 41 and second protrusions 42 on the diagonal line is 2 at a maximum, thereby making it possible to release excess pressure in a more effective manner. Furthermore, the diagonal line on which the number of the first protrusions 41 and second protrusions 42 is 2 is only the diagonal line DL8a. It has been confirmed that the process capability index in Example 8 is regarded as "⊙" for both the total height and the shutoff pressure.

From the foregoing, it is determined that in contrast to Comparative Example 1, Examples 1 to 8 are kept from varying in the total height and shutoff pressure of the safety mechanism 15, and the advantage of the present disclosure has been confirmed successfully. In addition, it has been confirmed that the number of the second protrusions 42 is preferably 11 or more. This is believed to be because the binding force tends to decrease when the number of the second protrusions 42 reaches the predetermined number (for example, 10 or less), thereby somewhat increasing the variations in total height and shutoff pressure.

Next, application examples of the present disclosure will be described.

Figure 9:
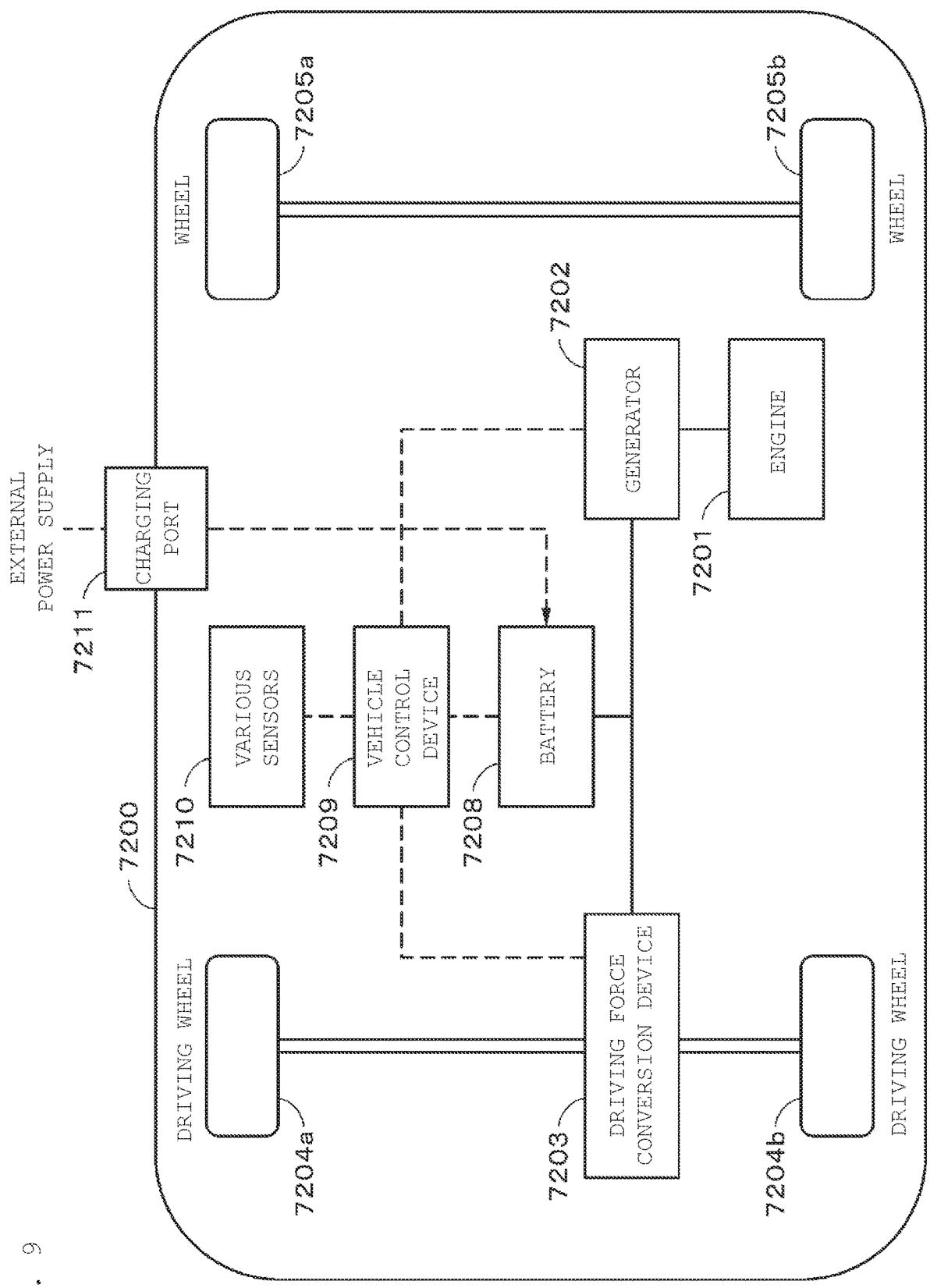
FIG. 9 is a diagram for explaining an application example according to an embodiment of the present technology.

"Power Storage System in Vehicle as Application Example" An example of applying the present disclosure to an electric storage system for a vehicle will be described with reference to FIG. 9. FIG. 9 schematically illustrates an example of the configuration of a hybrid vehicle that adopts a series hybrid system to which the present disclosure is applied. The series hybrid system is intended for a vehicle that runs on an electric power-driving force conversion device, with the use of electric power generated by a generator driven by an engine, or the electric power stored once in the battery.

The hybrid vehicle 7200 carries an engine 7201, a generator 7202, the electric power-driving force conversion device 7203, a driving wheel 7204a, a driving wheel 7204b, a wheel 7205a, a wheel 7205b, a battery 7208, a vehicle control device 7209, various sensors 7210, and a charging port 7211. The battery according to one embodiment of the present disclosure described above is applied to the battery 7208.

The hybrid vehicle 7200 travels with the electric power-driving force conversion device 7203 as a power source. An example of the electric power-driving force conversion device 7203 is a motor. The electric power-driving force conversion device 7203 is operated by the electric power of the battery 7208, and the torque of the electric power-driving force conversion device 7203 is transmitted to the driving wheels 7204a and 7204b. It is to be noted that the electric power-driving force conversion device 7203 can be applied to both an alternate-current motor and a direct-current motor by using direct current-alternate current (DC-AC) or reverse conversion (AC-DC conversion) in a required location. The various sensors 7210 control the engine rotation speed via the vehicle control device 7209, and control the position (throttle position) of a throttle valve, not shown. The various sensors 7210 include a speed sensor, an acceleration sensor, an engine rotation speed sensor, and the like.

The torque of the engine 7201 is transmitted to the generator 7202, and the torque makes it possible to reserve, in the battery 7208, the electric power generated by the generator 7202.

When the hybrid vehicle is decelerated by a braking mechanism, not shown, the resistance force during the deceleration is applied as torque to the electric power-driving force conversion device 7203, and the regenerative electric power generated by the electric power-driving force conversion device 7203 is reserved in the battery 7208 by the torque.

The battery 7208 is connected to a power source outside the hybrid vehicle, thereby making it also possible to receive electric power supply from the external power supply with the charging port 211 as an input port, and then reserve the received power.

Although not shown, the vehicle may be provided with an information processing device that performs information processing related to vehicle control, based on information on the secondary battery. Examples of such an information processing device include, for example, an information processing device that displays the remaining battery level, based on information on the remaining level of the battery.

It should be understood that as an example, the series hybrid vehicle has been described above, which runs on the motor with the use of the electric power generated by the generator driven by the engine, or the electric power stored once in the battery. However, the present disclosure can be also effectively applied to parallel hybrid vehicles which use the outputs of both an engine and a motor as a driving source, and appropriately switch three systems of running on only the engine, running on only the motor, and running on the engine and the motor. Furthermore, the present disclosure can be also effectively applied to so-called electric vehicles that run on driving by only a driving motor without using any engine.

An example of the hybrid vehicle 7200 to which the technique according to the present disclosure can be applied has been described above. The technology according to the present disclosure can be suitably applied to, for example, the battery 7208 in the configuration described above. Specifically, the battery according to one embodiment is applied to the battery 7208.

Figure 10:
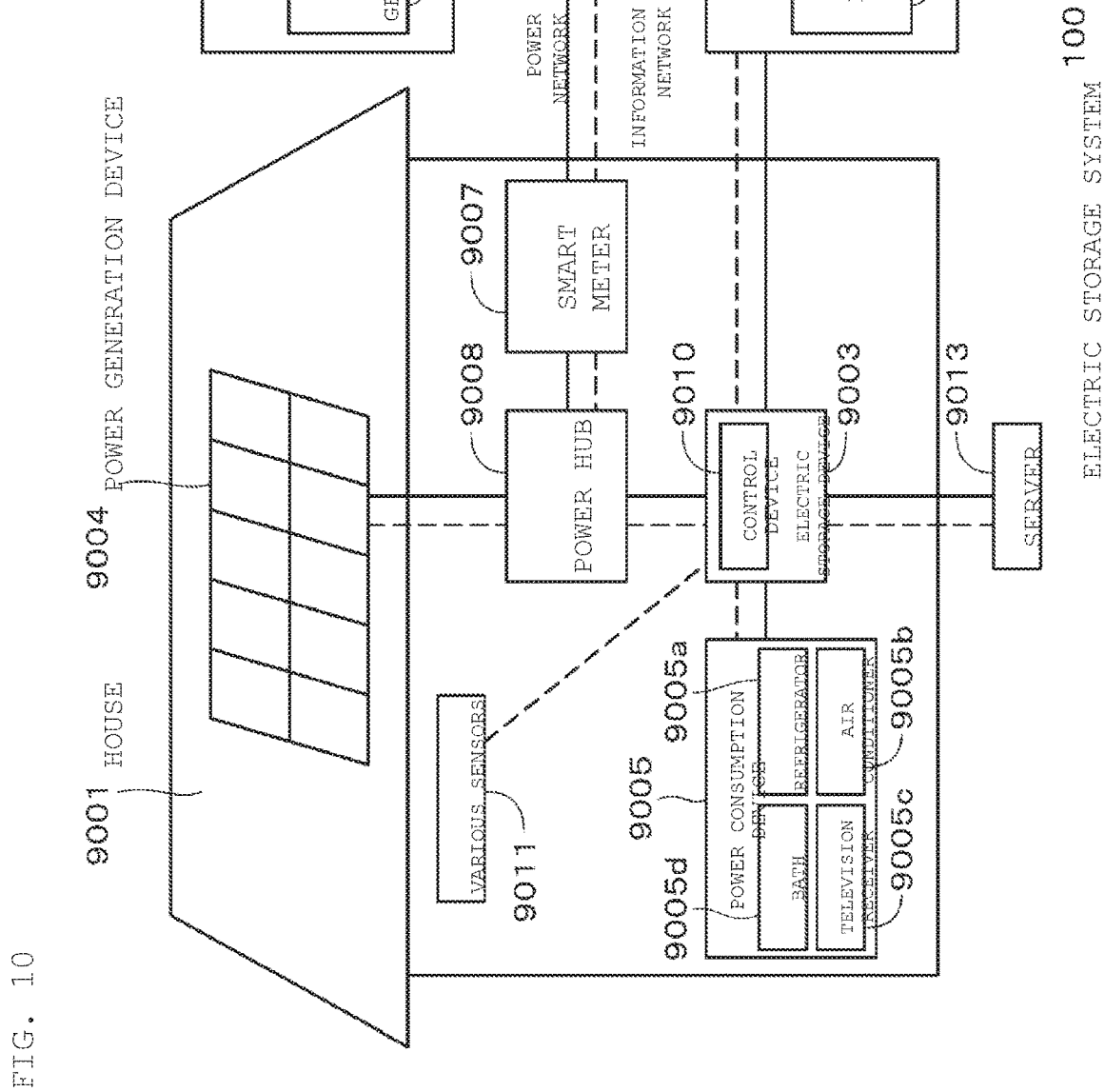
FIG. 10 is a diagram for explaining an application example according to an embodiment of the present technology.

An example of applying the present disclosure to a residential electric storage system will be described with reference to FIG. 10. For example, in an electric storage system 9100 for a house 9001, electric power is supplied to an electric storage device 9003 via a power network 9009, an information network 9012, a smart meter 9007, a power hub 9008, and the like, from a centralized power system 9002 such as a thermal power generation 9002a, a nuclear power generation 9002b, and a hydraulic power generation 9002c. At the same time, electric power is supplied to the electric storage device 9003 from an independent power source such as a home power generation device 9004. The electric power supplied to the electric storage device 9003 is stored. Electric power for use in the house 9001 is supplied through the use of the electric storage device 9003. The same electric storage system can be used not only for the house 9001 but also for buildings.

The house 9001 is provided with the power generation device 9004, a power consumption device 9005, the electric storage device 9003, a control device 9010 for controlling the respective devices, the smart meter 9007, and sensors 9011 for acquiring various types of information. The respective devices are connected by the power network 9009 and the information network 9012. As the power generation device 9004, a solar cell, a fuel cell, or the like is used, and electric power generated is supplied to the power consumption device 9005 and/or the electric storage device 9003. The power consumption device 9005 refers to a refrigerator 9005a, an air conditioner 9005b, a television receiver 9005c, a bath 9005d, and the like. Furthermore, the power consumption device 9005 includes an electric vehicle 9006. The electric vehicle 9006 refers to an electric car 9006a, a hybrid car 9006b, and an electric motorcycle 9006c.

The battery according to one embodiment of the present disclosure described above is applied to the power storage device 9003. The smart meter 9007 has the function of measuring the commercial power usage and transmitting the measured usage to the electric power company. The power network 9009 may be any one or combination of direct-current power feeding, alternate-current power feed, and contactless power feeding.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. With the information from the sensor 9011, weather condition, the human condition, etc. can be grasped to control the power consumption device 9005 automatically controlled, and thus minimize the energy consumption. Furthermore, the control device 9010 can transmit information on the house 9001 to an external electric power company or the like via the Internet.

The power hub 9008 performs processing such as power line branching and. DC/AC conversion. Examples of the communication method of the information network 9012 connected to the control device 9010 include a method of using a communication interface such as a UART (Universal Asynchronous Receiver-Transmitter: transmission/reception circuit for asynchronous serial communication), and a method of using a sensor network in accordance with a wireless communication standard, such as Bluetooth (registered trademark), ZigBee, and The Bluetooth (registered trademark) system, which is applied to multimedia communication, can perform one-to-many connection communication. The ZigBee uses the physical layer of the IEEE (Institute of Electrical and Electronics Engineers) 802.15.4. The IEEE 802.15.4 is a name of a short range wireless network standard referred to as PAN (Personal Area Network) or W (Wireless) PAN.

The control device 9010 is connected to an external server 9013. This server 9013 may be managed by any of the house 9001, an electric power company, and a service provider. The information transmitted and received by the server 9013 is, for example, power consumption information, life pattern information, power charges, weather information, natural disaster information, and information on electric power trade. These pieces of information may be transmitted and received from a power consumption device (for example, a television receiver) in the home, but may be transmitted and received from a device outside the home (for example, a mobile phone). These pieces of information may be displayed on a device that has a display function, for example, a television receiver, a mobile phone, a PDA (Personal Digital Assistants), or the like.

The control device 9010 that controls each unit is composed of a CPU (Central Processing Unit), a RAM (Random Access Memory), a ROM (Read Only Memory), and the like, and stored in the electric storage device 9003 in this example. The control device 9010 connected to the electric storage device 9003, the home power generation device 9004, the power consumption device 9005, the various sensors 9011, the server 9013 via the information network 9012, has the function of regulating, for example, the commercial power usage and the power generation. Further, the device may have a function such as handling a power trade in the power market.

As described above, the electric storage device 9003 can store therein electric power generated by not only the centralized power system 9002 such as the thermal power 9002*a*, the nuclear power 9002*b*, and the hydraulic power 9002*c*, but also the home power generation device 9004 (solar power generation, wind power generation).

Therefore, even if the home power generation device 9004 fluctuates in generated power, it is possible to achieve control such as making the amount of power sent to the outside constant or discharging the power as needed. For example, the system can be also used such that electric power obtained by solar power generation is stored in the electric storage device 9003, and at night, night-time power at a lower rate is stored in the electric storage device 9003, and then, the power stored by the electric storage device 9003 is discharged and used in the daytime at a higher rate.

It should be understood that while an example of the control device 9010 stored in the electric storage device 9003 has been described in this example, the control device 9010 may be stored in the smart meter 9007, or may be configured alone. Furthermore, the electric storage system 9100 may be used for multiple homes in multiple dwelling houses, or may be used for multiple detached houses.

An example of the electric storage system 9100 to which the technology according to the present disclosure can be applied has been described above. The technology according to the present disclosure can be suitably applied to the electric storage device 9003 in the configuration described above. Specifically, the battery according to one embodiment can be applied to the electric storage device 9003.

The present disclosure is applicable not only to large-size electric vehicles and aircraft, but also to electric motorcycles, electric bicycles, electric tricycles, electric small-size air vehicle (also referred to as drones, etc.), and the like. In addition, the present disclosure is also applicable to electronic devices (PCs smartphones, cellular phones, power tools, toys, etc.) in which a secondary battery can be used, and it is also possible to achieve the disclosure as an electronic device that receives power supply from the battery device described above.

The present technology is described below in a further detail according to an embodiment.

(1)

A battery including a safety valve that causes a deformation due to an increase in internal pressure of the battery;

a restraining part including a plurality of first protrusions formed along a first circumference to serve as a restrainer against a lead part when the safety valve and the lead part are shut off due to deformation of the safety valve; and an insulating holder including a plurality of second protrusions formed along a second circumference to insulate the safety valve and the restraining part, where the number of the first protrusions and the second protrusions arranged on a diagonal line including the first circumference and the second circumference is 3 or less.

(2)

The battery according to the foregoing (1), where on a diagonal line passing through at least one of the first protrusions or at least one of the second protrusions, the number of the first protrusions and the second protrusions arranged on the diagonal line is 3 or less.

(3)

The battery according to the foregoing (2), where the first protrusion and the second protrusion are located on one side of the diagonal line, and the first protrusion and the second protrusion are not present on the other side of the diagonal line.

(4)

The battery according to the foregoing (2), where the first protrusion and the second protrusion are positioned on one side of the diagonal line and the first protrusion or the second protrusion is positioned on the other side of the diagonal.

(5)

The battery according to any of the foregoing 1) to (4), where at least one of the number of the first protrusions and the number of the second protrusions is an odd number.

(6)

The battery according to the foregoing (5), where the number of the first protrusions and the number of the second protrusions are each an odd number.

(7)

The battery according to any of the foregoing (1) to (6), where the first protrusions are located at substantially equal intervals along the first circumference.

(8)

The battery according to any of the foregoing (1) to (7), where the second protrusions are located at substantially equal intervals along the second circumference.

(9)

The battery according to any of the foregoing (1) to (8), where the lead part includes a positive electrode lead led out from the positive electrode side.

(10)

The battery according to the foregoing (9), where the lead part includes a sub disk, and the safety valve and the positive electrode lead are connected via the sub disk.

(11)

The battery according to any of the foregoing (1) to (10), where the battery is a cylindrical lithium ion secondary battery.

(12)

An electric storage device including the battery according to any of the foregoing (1) to (12).

(13)

An electric vehicle including the battery according to any of the foregoing (1) to (12).

The present disclosure can also be applied to a battery including only either the first protrusion or the second protrusion. For example, a battery may be adopted in which the number of first protrusions (or second protrusions) on a certain diagonal line is 1 or less.

The present disclosure can also be applied to secondary batteries other than lithium ion secondary batteries, and even primary batteries. The disclosure can also be applied to rectangular-type batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
a safety valve configured to cause a deformation due to an increase in internal pressure of the battery;
a restraining part including a plurality of first protrusions provided along a first circumference to serve as a restrainer against a lead part when the safety valve and the lead part are shut off due to deformation of the safety valve; and
an insulating holder including a plurality of second protrusions provided along a second circumference to insulate the safety valve and the restraining part,
wherein a number of the first protrusions and the second protrusions arranged on a diagonal line including the first circumference and the second circumference is 3 or less; and
wherein one of the first protrusions and one of the second protrusions are located on a first side of the diagonal line.

2. The battery according to claim 1,
wherein the first protrusions and the second protrusions are not present on the diagonal line on a second side opposed to the first side.

3. The battery according to claim 1,
wherein at least one of the first protrusions or the second protrusions is located on the diagonal line on a second side opposed to the first side.

4. The battery according to claim 1,
wherein at least one of the number of the first protrusions and the number of the second protrusions includes an odd number.

5. The battery according to claim 4,
wherein each number of the first protrusions and the second protrusions includes an odd number.

6. The battery according to claim 1,
wherein the first protrusions are located at substantially equal intervals along the first circumference.

7. The battery according to claim 1,
wherein the second protrusions are located at substantially equal intervals along the second circumference.

8. The battery according to claim 1,
wherein the lead part includes a positive electrode lead led out from a positive electrode.

9. The battery according to claim 8,
wherein the lead part includes a sub disk, and
the safety valve and the positive electrode lead are connected via the sub disk.

10. The battery according to claim 1,
wherein the battery includes a cylindrical lithium ion secondary battery.

11. An electric storage device comprising the battery according to claim 1.

12. An electric vehicle comprising the battery according to claim 1.

* * * * *